United States Patent [19]

Hagedorn et al.

[11] Patent Number: 4,522,641

[45] Date of Patent: Jun. 11, 1985

[54] APPARATUS FOR BENDING GLASS SHEETS

[75] Inventors: Floyd T. Hagedorn, Oregon; Merwyn L. Koontz, Maumee, both of Ohio

[73] Assignee: Libbey-Owens-Ford Company, Toledo, Ohio

[21] Appl. No.: 604,461

[22] Filed: Apr. 27, 1984

[51] Int. Cl.³ .......................................... C03B 23/023
[52] U.S. Cl. ....................................... 65/291; 65/273; 65/287; 65/290
[58] Field of Search ................. 65/104, 106, 107, 273, 65/287, 291, 114, 290

[56] References Cited

U.S. PATENT DOCUMENTS

| 3,832,153 | 8/1974 | Bezombes | 65/291 |
| 4,082,530 | 4/1978 | Seymour | 65/106 X |

FOREIGN PATENT DOCUMENTS 845786  9/1939  France .................................. 65/273

Primary Examiner—Arthur Kellogg
Attorney, Agent, or Firm—Phillip S. Oberlin

[57] ABSTRACT

A press bending mold having a flexible, continuous shaping surface that is readily adjustable to produce a wide variety of simple as well as more complex, compound shapes. The mold includes a plurality of adjustment controls that are operably connected at select points on the backside of the shaping surface. The controls are conveniently located outwardly of the press area to enable alterations to be made to the contour of the shaping surface, quickly and easily, without interference or interruption of the glass bending and tempering operation.

12 Claims, 5 Drawing Figures

APPARATUS FOR BENDING GLASS SHEETS

BACKGROUND OF THE INVENTION

The present invention relates generally to the production of bent sheets of refractory material such as glass, and more particularly to a novel adjustable mold for bending such sheets.

Curved or bent sheets of glass are commonly used as glazing closures in vehicles such as automobiles and the like. For such applications, the glass sheets must be bent to precisely defined curvatures determined by the configuration and size of the vehicle openings as well as the overall styling of the vehicle. At the same time, it is important that the bent sheets meet stringent optical requirements and that the viewing area of the closure or window be free of optical defects that would tend to interfere with clear viewing therethrough. Thus, it can be appreciated that not only is it required to have bending apparatus that will shape glass sheets to precise curvatures, but also that it will do so without causing serious optical defects to the surfaces thereof. Further, bent glass sheets intended for use as glazing closures in vehicles are subjected to an additional heat treatment process to either anneal or temper the glass for strengthening the same and increasing the resistance thereof to damage resulting from impact.

Generally, the commercial production of bent sheets of glass of the above character includes heating pretrimmed flat sheets of glass to the softening temperature thereof, pressure bending the heated sheets to a desired curvature between male and female mold members having complementary shaping surfaces and then cooling the bent sheets in a controlled manner to a temperature below the annealing range of glass. Such bending of glass has been referred to as "press bending" and may be carried out with the glass sheets supported in either a horizontal, vertical or oblique orientation.

In order to obtain the maximum accuracy of curvature, while maintaining the area of contact between the mold and the glass as low as possible, it has become a general practice to construct the male mold member with a substantially solid or continuous shaping surface which contacts the entire surface of the sheet, and the female mold member with an outline or ring-type shaping surface which contacts only the marginal edge portions of the sheet. Traditionally, mold members have been fabricated of wood, metal or refractory and have been used with various degrees of success.

However, since the introduction of press bending the use of the process has greatly expanded, both in volume and in the number of different shapes produced, and has arrived at a point where it has become evident that the traditional mold per se and the materials to fabricate the same are becoming impractical for a number of reasons. For one, solid mold members are becoming increasingly more expensive to build due in part to the escalating costs of labor and materials. This has become more evident of late since there is a greater variety of shapes to be bent, requiring a greater variety of molds. The expense involved also means that such molds do not lend themselves well to short production runs of specialized shapes, or to experimental and development work, in which a variety of shapes may be tried before one is finally settled on for production purposes.

Another factor is useful life. While wooden molds exhibit good stability characteristics under fluctuating temperature conditions, they tend to burn and break down with extended use. Although aluminum or other metal molds do not burn, they have high coefficients of thermal expansion and tend to distort under the fluctuating temperature conditions commonly encountered in the press bending process. As a result, they must be frequently reworked to maintain the accuracy of the shaping surface, and it is apparent that there is a practical limit to the number of times a mold can be reworked before it is no longer feasible to use it.

The distortion problems associated with the metal molds have been appreciably alleviated with the development of the adjustable surface solid metal mold. Generally, the shaping surface consists of a relatively flexible metal plate that is attached to a rigid backing plate by a series of strategically placed adjustment screws. Slight alterations can be made to the contour of the shaping surface by manipulation of the screws thus permitting corrective measures to be taken to remedy minor distortions to the surface. Likewise, such apparatus may be utilized to produce different configurations that are not too dissimilar from one another, therefore reducing tooling inventory to some extent. However, in the automotive industry, the glazing closures or windows are generally formed of compound bends, i.e., sheets having radii of curvature about mutually perpendicular axes of bending, and the degree of compound curvature that can be applied to a metal plate is very restricted due to the relative inelasticity of metal. If curved beyond its limitations, creases or ripples will form in the surface thereof creating an undesirable shaping surface, thus restricting each apparatus to a limited series of shapes. Also, since only slight alterations may be made to the surface of the flexible plate, they have to be preshaped to the approximate curvature desired during manufacture.

One of the more prominent materials used in the fabrication of solid molds has been cast refractories such as vitrious silica, and these cast refractory molds have admirably served the purposes for which they were designed. Largely due to durability and ease of forming, they are one of the most reasonable for extended runs. However, as previously mentioned, there is often the need for short production runs of specialized shapes requiring a separate mold for each shape. The inventory of molds can become quite extensive and although cast refractory molds are among the most economical to build the expenses involved in their fabrication can become prohibitive, particularly when only a small number of glass sheets of any particular bend or shape are required. Also, in experimental and development work it is often necessary to make numerous and sometimes extensive alterations to a mold before producing an acceptable product, and as previously mentioned there is a practical limit to how often this can be done before it is necessary to replace the mold with another. Obviously, constructing a new mold is expensive and time consuming, adding to the overall cost of ultimately producing a salable product.

SUMMARY OF THE INVENTION

The present invention obviates the above noted shortcomings of the prior art by providing a new and improved continuous-surface bending mold that is readily adjustable to produce simple cylindrical shapes as well as more complex, compound shapes. The mold comprises a shaping element that includes a resilient body with a plurality of loosely interwoven flexible metal bands encapsulated therein. Attached to the underside of the shaping element ast spaced intervals along the flexible bands, are a plurality of adjustable devices for adjusting the disposition, e.g., the vertical disposition, of select portions of the shaping element relative to each other to alter the curvature thereof. Thus, by the judicious manipulation of the adjustable devices, it can be appreciated that a precise curvature corresponding to that desired may be imparted to the shaping element. The controls for manipulating the devices are remote therefrom and located on one or opposite sides of the mold for quick and easy adjustment without entry into the maze of components within the mold area and without interference or stoppage of the glass bending and tempering operation. It is also within the purview of this invention that after the final desired shape is developed in the mold surface it may be used to construct a female master which in turn would be used in the fabrication of conventional mold members, such as the above mentioned cast refractories, freeing the novel adjustable mold for further experimental and development work.

Therefore, it is a primary object of the present invention to provide an improved adjustable form or bending mold for shaping refractory sheets.

Another object of the present invention is to provide a mold of the above character including a flexible continuous shaping surface with means selectively adjusting the relative dispositions of portions thereof to alter the curvature of the shaping surface.

Another object of the present invention is to provide a mold of the above character that is readily adjustable without interrupting furnace operations.

Still another object of the present invention is to provide a mold of the above character that is capable of producing simple as well as more complex, compound bends within precise tolerances, and that can be used to produce a large variety of parts.

Other objects and advantages will become more apparent during the course of the following description when taken in connection with the accompanying drawings.

BRIEF DESCRIPTION OF THE DRAWINGS

In the drawings wherein like numerals refer to like parts throughout.

DESCRIPTION OF THE PREFERRED EMBODIMENT

Figure 1:
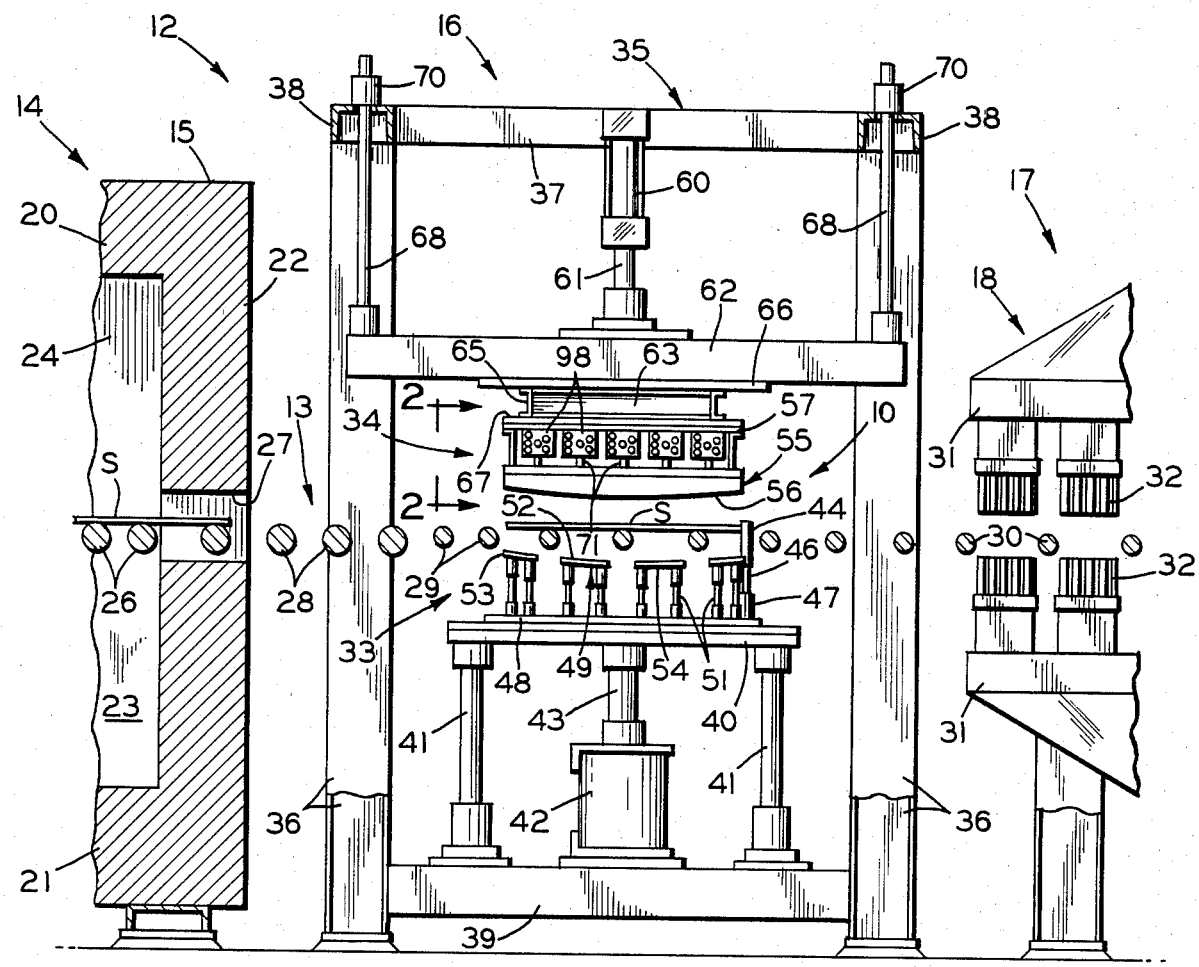
FIG. 1 is a side elevational view of a bending apparatus interposed between a glass heating station and a glass tempering station and embodying the novel bending mold of this invention.

Referring now in detail to the drawings, there is illustrated in FIG. 1 an improved bending apparatus, generally designated 10, constructed in accordance with this invention and hereinafter more fully described, embodied in a horizontal glass sheet bending and tempering apparatus, comprehensively designated 12. Apparatus 12 includes a continuous conveyer system 13 adapted to support a plurality of sheets S for movement in a generally horizontal path through a heating station 14 having a furnace 15 for heating the sheets to their softening point or bending temperatures, a bending station 16 embodying the novel apparatus 10 of this invention for bending the heated sheets S to the desired shape, and a tempering station 17 having chilling means 18 for rapidly reducing the temperature of the bent sheets to produce a desired temper therein.

While the invention will be described in connection with the horizontal bending and tempering apparatus depicted in the drawings, it should be understood that the press bending apparatus 10 of this invention is not restricted to such a horizontal operation, but also has utility in a vertical press bending operation or any environment utilizing either a single mold or opposed press members for shaping sheets of refractory material, such as glass.

In the illustrative embodiment, the glass sheets S are heated in the furnace 15, which is of the tunnel-type having a top wall 20, a bottom wall 21, a rear-end wall 22, and opposite side walls 23, all formed of a suitable refractory material in defining a heating chamber 24. The heating chamber 24 can be heated in any desired manner by suitable heating means, such as gas burners or electrical resistance elements for example (not shown), located in the top and side walls of furnace 15. Such heating means are suitably controlled by apparatus (also not shown) to obtain the desired temperature in various zones within the heating chamber 24. The sheets S are carried through the heating chamber 24 of the furnace on a plurality of conveyor rolls 26, forming a part of the conveyor system 13, and extending transversely across the chamber 24 with their opposite ends projecting through the opposite walls 23 and suitably journaled in bearing blocks (not shown) located exteriorly of and along the side walls of furnace 15.

A plurality of glass sheets S are individually loaded on and supported in a generally horizontal plane on the longitudinally spaced conveyor rolls 26 at the entrance end of the furnace (not shown) and heated in a controlled manner to the desired bending temperature during their passage therethrough. Upon emerging through an opening 27 in the rear end wall 22 of furnace 15, the heated glass sheets S are transferred from conveyor rolls 26 onto a second series of spaced conveyor rolls 28, and then upon a third series of conveyor rolls 29, both of which also form a part of the conveying system 13 and which are journaled at their opposite ends in suitable bearing blocks (not shown) located along and on opposite sides of the bending station 16. The series of rolls 29 support the glass sheets S horizontally for movement into and within the bending station 16 before and after bending, and then advance them to the next series of conveyor rolls 30 which convey the sheets through the tempering station 17 wherein their temperature is rapidly reduced to produce the proper temper in the glass. The tempering station 17 includes chilling means 18 comprising upper and lower blastheads 31 disposed above and below the path of movement of the glass sheets and which are provided with a series of tubes 32 operable to direct opposed streams of cooling fluid, such as air or the like, toward and against the opposite surfaces of the sheets S moving along such path.

In accordance with this invention, the bending apparatus 10 consists essentially of a movable lower press member 33 and an upper press member 34, both suitably mounted within a rigid framework 35, which includes two substantially vertical columns 36 located on each side of the conveyor system and spaced longitudinally therealong, with the columns of the opposite sides of the conveyor being laterally aligned. The columns 36 extend upwardly above the upper press member 34 and are tied together at their upper ends by horizontal beams 37 and 38 extending longitudinally and transversely of the conveyor, respectively, and secured at their opposite ends to the aligned columns 36 to form a rigid box-like structure. A base member 39 extends between the upright columns 36 for supporting the lower press member 33 and associated parts. The upper press member 34 is mounted above conveyor rolls 29 while the lower press member 33 is located below the conveyor rolls 29 and mounted on a carriage 40 for vertical reciprocal movement toward and away from the press member 34.

The carriage 40 is supported by guide members 41 and vertically movable by a fluid actuator 42 mounted on base member 39 and having a suitable piston rod 43 for raising and lowering the press member 33 between the lower position beneath conveyor rolls 29 and an upper position thereabove for lifting a heat-softened glass sheet S from the conveyor rolls 29 and pressing the same against the upper press member 34 into the desired shape. After bending, piston rod 43 is retracted to lower the press member 33 below conveyor rolls 29, depositing the bent sheet on the rolls 29 for advancement into the tempering station 17.

A pair of laterally spaced locator stops 44 (only one of which is shown) are positioned in the path of movement of the advancing glass sheets to interrupt movement thereof and accurately position the sheets in the desired location relative to the lower press member 33. Each stop 44 is secured to the distal end of a piston rod 46 of a fluid actuating cylinder 47 mounted on the carriage 40. The cylinders 47 are operative to raise and lower the stops 44 between an upper position above conveyor rolls 29 in the path of movement of the glass sheet S and a lower position therebeneath.

The lower press member 33 is of conventional outline or ring-type construction and comprises a base member 48 secured to the carriage 40 and a shaping rail 49 connected to the base member 48 in spaced relation thereto by means of a series of connecting rods 51. The shaping rail 49 conforms in outline to the glass sheets S to be bent and is provided on its upper face with an upwardly directed shaping surface 52 to impart the desired curvature to the sheet. Of course, the particular outline of the shaping rail 49, as well as the specific curvature at the shaping surface 52, is dictated by the desired finished shape of the glass sheet being bent and can vary as desired.

To permit displacement of the lower shaping rail 49 above the level of the conveyor rolls 29 for lifting the sheets thereabove into pressing engagement with the upper press member 34 the lower shaping rail 49 is formed of a plurality of segments including end bars 53 extending generally in the direction of rolls 29 and side bars 54 extending generally transversely to the conveyor rolls 29 and spaced apart from each other a sufficient distance to pass between adjacent rolls 29.

Figure 2:
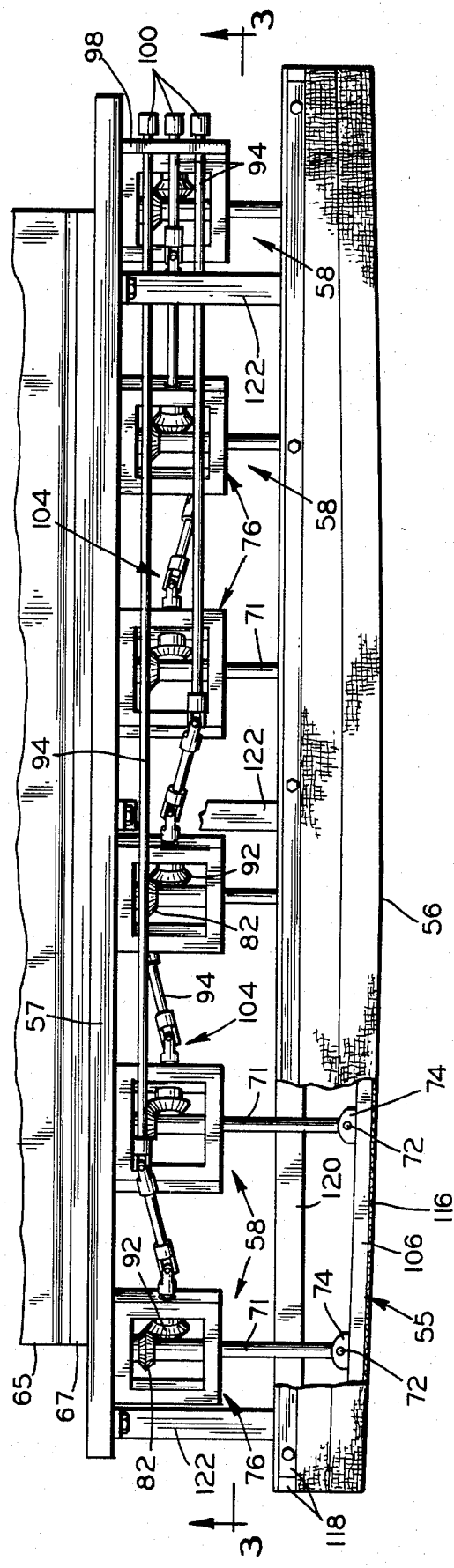
FIG. 2 is a side elevational view, on an enlarged scale, taken along 2—2 of FIG. 1, of the bending mold constructed in accordance with this invention showing a means for adjusting the vertical disposition of select portions of the shaping surface.

The upper press member 34 of the present invention includes a shaping element 55 having a downwardly directed, generally convex shaping surface 56, such shaping element being connected to a base member 57 by a plurality of adjustable connectors 58 (FIG. 2). The member 34 is supported on frame 35 by at least one actuating cylinder 60 mounted on one of the upper horizontal beams 37 and having a suitable reciprocal piston (not shown) provided with a piston rod 61 connected at its outer end to a vertically reciprocal platen frame 62. The base member 57 of the press member 34 is connected to the platen frame 62 for movement therewith by means of supporting structure including interconnected structural members 63 and 65 sandwiched between support plates 66 and 67. A plurality of guideposts 68 are connected at their lower ends to the four corners of platen frame 62, respectively, and extend upwardly through the suitable bushings 70 mounted on upper horizontal beams 38 for sliding movement relative thereto to properly guide platen frame 62 during its vertical reciprocal movement.

Figure 4:
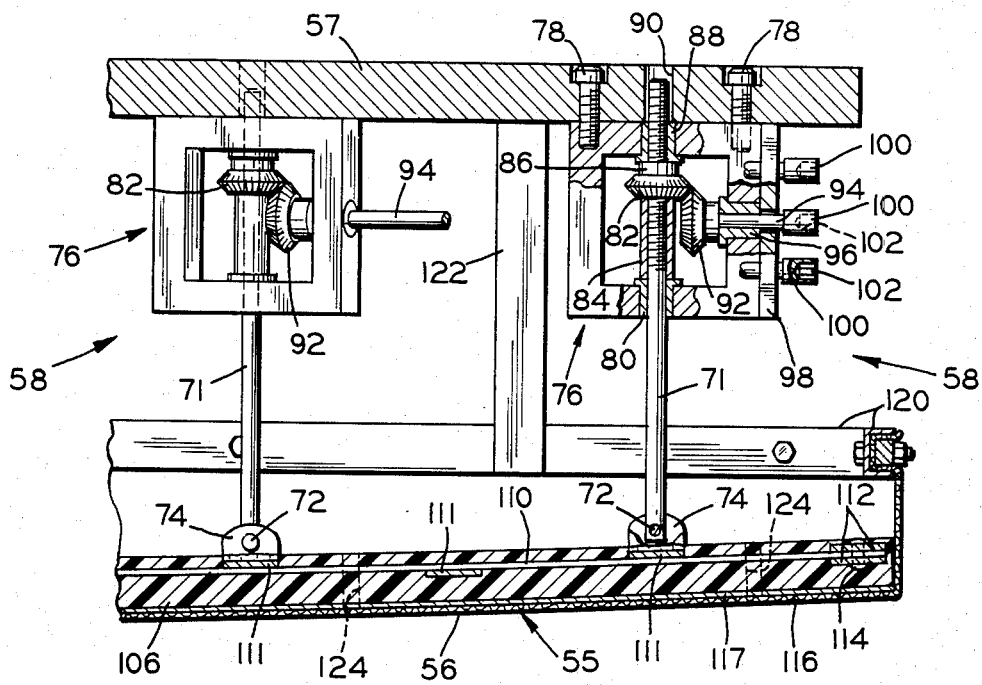
FIG. 4 is a fragmentary, enlarged vertical sectional view of the control end of the bending mold, showing the vertical adjusting means in greater detail.

Referring now to FIG. 2, the adjustable connectors 58 are located at spaced intervals along the shaping element 55 for vertically adjusting portions thereof to impart the precise curvature to the shaping element 55 corresponding to that desired on the finished glass sheet. Each adjustable connector 58 includes an actuating rod 71 pivotally secured at one end by means of a pin 72 to a clevis 74 affixed to the shaping element 55. As best shown in FIG. 4, the opposite end of the actuating rod 71 is provided with external threads and projects through a gear housing 76 attached to the base member 57, as by screws 78. The rod 71 extends through a bushing 80 affixed to one wall of the housing 76 and through a beveled gear 82 mounted within housing 76 for rotary movement but fixed against axial movement by means of a spacer or sleeve 84. The gear 82 is formed with a shank 86 having an internal thread for threaded engagement with rod 71. The rod 71 projects outwardly through a bushing 88 affixed to the opposite wall of housing 76. An appropriate opening 90 is provided in base member 57 in alignment with rod 71 to allow for free axial movement thereof. The gear 82 meshes with right angularly related bevel gear 92 affixed to the inner end of a control shaft 94 extending through a bushing 96 affixed to a side wall of gear housing 76. The control shaft 94 is of a suitable length to extend through an appropriate opening in a plate 98 conveniently positioned to one side of the base member 57. The distal end of shaft 94 is provided with a socket 100 having a flat sided opening 102 therein for receiving a hand operable tool (not shown) having a complementary flat sided head for turning the shaft 94 for vertically displacing the actuating rod 71. Thus, the portion or region of the shaping element 55 below the rod 71, as viewed in FIG. 4, can be raised or lowered as desired via the gearing arrangement in housing 76 and control shaft 94 by manipulating socket 100. Of course, other arrangements may be used in lieu of the socket 100 for turning the control shaft 94, such as a hand controlled knob or a reversing motor or the like that may be coupled to the shaft and activated on command to turn the control shaft 94 in one direction or the other.

A plurality of the adjustable connectors 58 are utilized and are strategically positioned, as will hereinafter be described, to provide controlled adjustment over the full extent of the shaping element 55. The elements of each connector 58 are identical to that described above and are identified by the same reference characters. Locating the sockets 100 or other manipulative controls outwardly of the press area permits quick and easy adjustment of the shaping element 55 without entry into the maze of components within the press area and without interference or stoppage of the glass bending and tempering operation.

Figure 3:
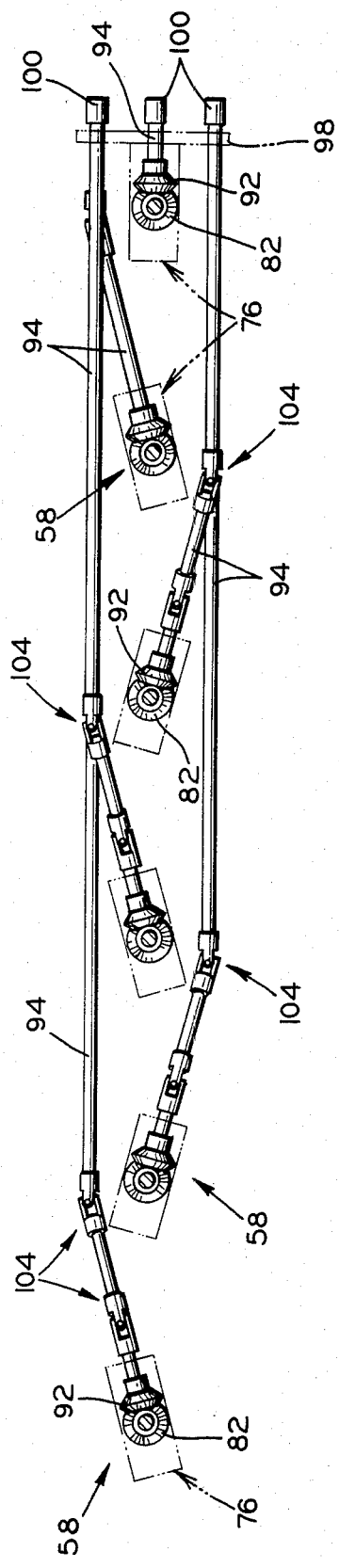
FIG. 3 is a diagrammatic view taken along 3—3 of FIG. 2 of one row of the vertical adjusting means of this invention.
Figure 5:
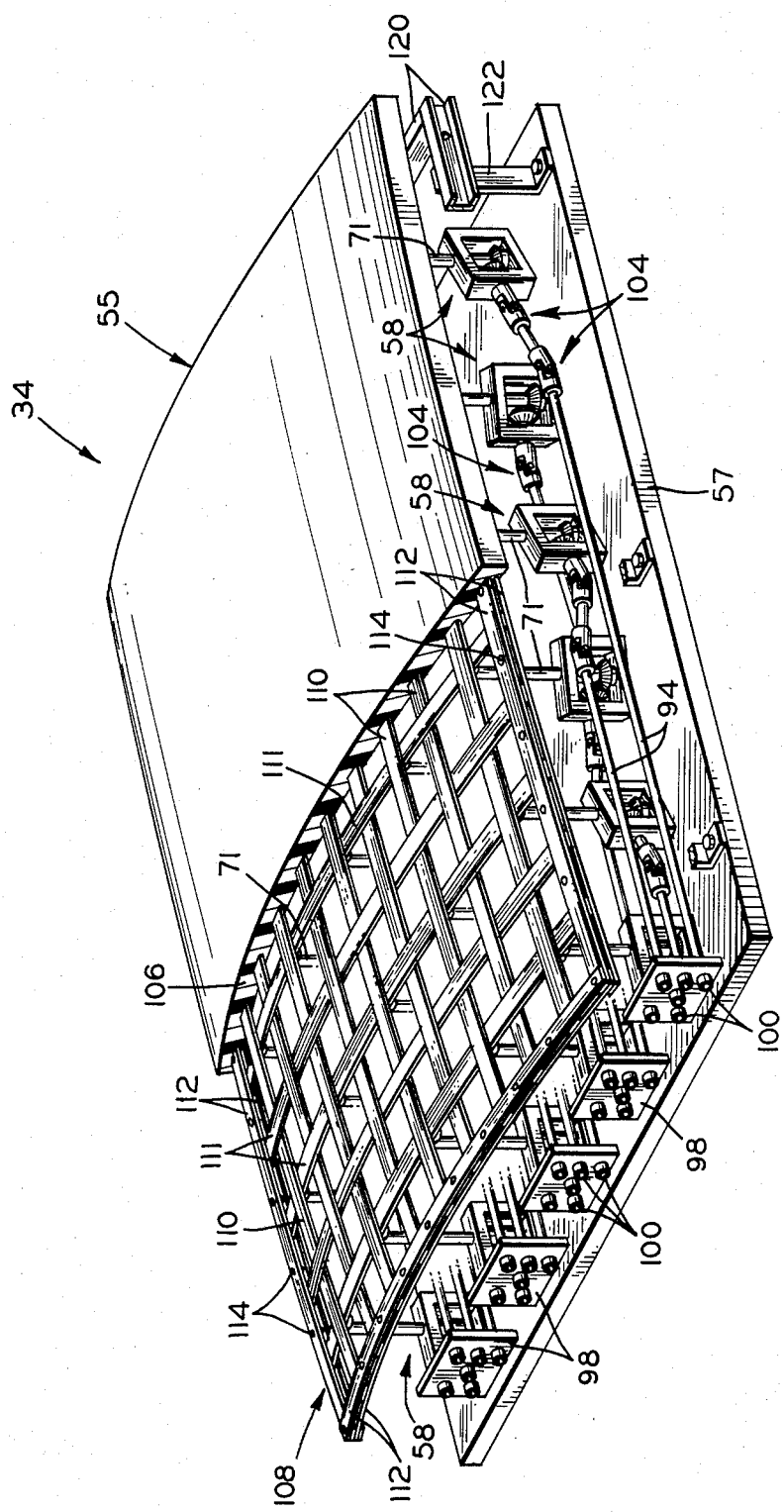
FIG. 5 is a perspective view of the novel bending mold of this invention with portions broken away for the sake of clarity.

One form of control arrangement that may be utilized is illustrated in FIGS. 2 and 3 wherein a plurality of the adjustable connectors 58 are longitudinally aligned and the sockets 100 are preferably located on one side only of the press area, which is often desirable where the other side of the press is incumbered by the drive and/or other mechanical impediments. To this end, all but one of the control shafts 94 are provided with at least one flexible coupling or torque transmitting universal joint 104 interposed between the gear 92 and the socket 100. Although only one row or column of adjustable connectors 58 is depicted in FIG. 3 for clarity sake, it should be appreciated that generally a plurality of rows are employed to provide adequate adjustment to the shaping element 55 as best illustrated in FIG. 5. The distal ends of the control shafts 94 of each row extend through respective openings in the plate 98 and are conveniently arranged for easy access and manipulation of sockets 100. Of course, if there is an excessive number of adjustable connectors employed or if obstructions or space limitations exist, it may be more feasible to locate the sockets on more than one side. The present invention contemplates the use of any number of adjustable connectors 58 that may be disposed singularly or in rows.

Referring now to FIG. 5, there is illustrated the upper press member 34 in inverted orientation, with parts removed to more clearly aid in its description. The main body portion or shaping element 55 is of composite construction comprising a silicone rubber 106 or other resilient material that is flexible and able to withstand repeated use in a high temperature environment, and a latticework assembly 108 encapsulated in the silicone rubber. The latticework assembly 108 is comprised of a plurality of longitudinally and transversely extending steel bands 110 and 111 respectively, that are loosely interwoven into an open, unbinding pattern. The bands 110 and 111 are relatively thin and flexible and in the specific embodiment illustrated are approximately 1.25 inches wide by 0.035 inch thick and disposed substantially normal to one another at approximately 3" centers. This arrangement, while in no manner limitative, provides ample flexibility and yet sufficient rigidity to resist deformation during the bending operation. The free ends of the steel bands 110 and 111 may be fixed in spaced relationship along the perimeter of the latticework assembly 108 by pairs of superimposed flexible bands or straps 112 fastened together as by rivets 114. The straps 112 may be of the same material and dimensions as the steel bands 110 and 111. Preferably, all the bands are treated before assembly with a release agent such as common household wax to prevent the adherence of the silicone thereto and also to serve as a lubricant to allow free relative movement between adjacent contacting surfaces thereof.

Prior to encapsulating the latticework 108 in the silicone rubber, the clevises 74 are properly located at specific points on the steel bands 110 or 111 and affixed thereto as by welding. As previously mentioned, the actuating rods 71 of connectors 58 are secured to the clevises 74 and are strategically positioned to provide controlled adjustment over the full extent of the shaping element 55. It also is desirable that the adjustable connectors 58 be aligned in a row, as illustrated in FIG. 3, to facilitate locating the manipulating sockets 100 in a concentrated area for convenience of adjustment. In the apparatus of the present invention, although not restricted thereto, the clevises 74 and the actuating rods 71 are located directly beneath every other intersection of bands 110 and 111, as best shown in FIG. 5. This arrangement has proven quite effective for this particular apparatus but may be altered as dictated by the size and/or shape of the mold under construction.

The latticework assembly 108 is encapsulated in its entirety by silicone rubber 106 by any suitable means such as casting, for example. It is desirable that there is at least a $\frac{1}{4}''$ thickness of silicone rubber 106 between the shaping surface thereof and the bands 110, 111 and 112 to provide a relatively stable yet flexible body that will yield to adjustments while providing a smooth, continuous transitional surface between adjacent areas of adjustment.

The outer, glass contacting surface of the shaping element 55 is typically covered with a suitable, non-abrasive, heat resistant material, such as fiberglass cloth 116, for example, to provide a smooth and somewhat resilient surface to the heat-softened glass sheet. Also, if desired, one or more layers of untreated Fiberfrax ® paper 117 may be placed intermediate the outer surface of the shaping element and the fiberglass cloth to insulate the silicone from the hot glass and to assist in smoothing out any irregularities present in the surface. As illustrated in FIGS. 2 and 4, the cloth 116 is stretched over the shaping element 55 and held in place by retainer bars 118 which are bolted to channel members 120 running along the entire perimeter of the shaping element 55. The channel members 120 are affixed to a plurality of posts 122 bolted to the base member 57.

In a typical press bending operation employing the novel mold member 34 of the present invention, the shaping element 55 is first preset to the precise or near precise curvature corresponding to the part to be run. Generally, this is accomplished prior to installing the fiberglass cover 116 and involves the use of a forming fixture such as a master template (not shown) or a complemental female mold. The shaping surface 56 of mold member 34 is placed against the forming fixture and brought into conformity therewith by manipulation of the sockets 100 as required. After the final presetting adjustments are made, the cover 116 is secured in place and the mold is ready for use.

Alterations to the shaping surface may be made at any time during operation by manipulation of the sockets 100 which are conveniently located in a readily accessible area outside the congested area of the mold. The sockets 100 may include indicia (not shown) in correlation to the respective adjustable connector it controls, to assure speed and reliability when making adjustments with minimum interruption time. Also, as previously mentioned, it is conceivable that the control shafts 94 may be coupled to individual drive mechanisms such as reversing motors which can be activated on command by an operator, or for that matter, by a computer programmed to set various contours in the shaping element 55 corresponding to individual parts to be produced.

It is contemplated that after the final adjustments have been made and a satisfactory product produced, the bending apparatus 10 can be removed from operation and used to make a female master which in turn can be employed to fabricate the more economical cast refractory mold. Thus, the apparatus 10 is freed for additional production or development work.

In order to avoid excessive heat build-up in the press member 34, it is preferred to provide a plurality of airholes 124 (FIG. 4) in the shaping element 55. These airholes can be formed in the silicone rubber 106 during casting thereof or by drilling afterward. Alternatively, the press member can be enclosed with a gas impervious, flexible, bellows-type seal (not shown) and an air inlet connection (also not shown) provided in the plate 57. Air can then be applied during bending to provide, through the means of the airholes 124, a cushion of air between the shaping surface 56 and the sheet S, and/or after bending to release the bent sheet from the mold. Alternatively, a negative air pressure can be provided creating a suction force along the shaping surface 56 to assist in shaping the sheet S. Also it will be appreciated that the suction force can hold the sheet against the shaping surface 56 after the lower press member 33 is retracted, and the sheet subsequently deposited on a shuttle carrier (not shown) to transfer it out of the bending area in a situation where it is not desired to return the sheet to the conveyor. For that matter, the upper mold member 34 may be attached to a suitable shuttle mechanism and transfer the sheet to a location remote to the bending area.

It should be appreciated that although the apparatus of this invention has been described in connection with the shaping of glass sheets in a horizontal press bending operation, it is equally applicable in vertical or other well-known operations. Also, a pair of the novel adjustable forms or molds with complementary shaping surfaces can be used to shape a sheet of glass instead of one of the adjustable molds and a conventional ring type mold, as described, or even the adjustable form may be used in conjunction with a shaping ring to provide a localized support or shaping surface.

It is to be understood that the form of this invention herewith shown and described is to be taken as an illustrative embodiment only of the same, and that various change in the shape, size and arrangement of parts, as well as various procedural changes, may be resorted to without departing from the spirit of the invention.

We claim:

1. An adjustable form for use in bending a heat-softened glass sheet, comprising a rigid mounting plate, a flexible shaping element in spaced relation to said rigid mounting plate, said shaping element having a resilient body portion which is simultaneously flexible in more than one direction and including a substantially continuous shaping surface which approximates in contour and area the surface desired in the glass sheet after bending and spaced, flexible stiffening means associated with said body portion, and means for mounting said flexible shaping element on said rigid mounting plate including adjustment means for selectively adjusting the disposition of portions of said flexible shaping element relative to said rigid mounting plate for altering the shape of said flexible shaping element and thus the contour of said shaping surface.

2. An adjustable form as defined in claim 1, wherein said stiffening means is encapsulated in said resilient body portion.

3. An adjustable form as defined in claim 2, wherein said stiffening means comprises a plurality of loosely interwoven flexible bands.

4. An adjustable form as defined in claim 1, wherein said adjustment means comprises a plurality of actuating rods each operatively connected at one of its ends to the backside of the shaping surface of said shaping element at spaced points throughout, and means for extending and retracting said actuating rods.

5. An adjustable form as defined in claim 1, wherein said stiffening means comprises a plurality of loosely interwoven flexible metal bands encapsulated in said resilient body portion, and wherein said adjustment means comprises a plurality of actuating rods each operatively connected at one of its ends to a flexible metal band at spaced points therealong, and means for extending and retracting said actuating rods.

6. An adjustable form as defined in claim 5, wherein said last mentioned means include a plurality of gear assemblies each operatively connected to one of said actuating rods at the end thereof opposite said one end, and control shafts extending outwardly of said adjustable form and connected to said gear assemblies, respectively, for extending and retracting said actuating rods.

7. An adjustable form as defined in claim 6, wherein said gear assemblies are aligned in columns and said control shafts include torque transmitting universal joints enabling said shaft portions extending outwardly of said adjustable form to be located in a cluster.

8. An adjustable form as defined in claim 1, wherein said resilient body portion comprises a silicone rubber and said shaping surface is defined by a non-abrasive heat resistant fiberglass cloth stretched over the silicone rubber.

9. An adjustable form as defined in claim 5, wherein said loosely interwoven flexible metal bands are disposed, respectively, in a substantially normal orientation, each said flexible metal band having opposite free ends, said free ends terminating adjacent the perimeter of said resilient body portion, and means interconnecting said free ends whereby said flexible metal bands are maintained in the substantially normal orientation.

10. An adjustable form as defined in claim 9, wherein said interconnecting means comprises a plurality of superimposed pairs of spaced flexible metal bands which grippingly engage said free ends therebetween.

11. An adjustable form for use in bending a heat-softened glass sheet, comprising a rigid mounting plate, a flexible shaping element in spaced relation to said rigid mounting plate, said shaping element having a resilient body portion which is simultaneously flexible in more than one direction and including a substantially continuous shaping surface, and spaced, flexible stiffening means associated with said resilient body portion, said stiffening means being encapsulated in said resilient body portion, and means for mounting said flexible shaping element on said rigid mounting plate including adjustment means for selectively adjusting the disposition of portions of said flexible shaping element relative to said rigid mounting plate for altering the shape of said flexible shaping element and thus the contour of said shaping surface.

12. An adjustable form as defined in claim 11, wherein said stiffening means comprises a plurality of loosely interwoven flexible bands.

* * * * *